United States Patent [19]

Edelman

[11] 3,738,008

[45] June 12, 1973

[54] EXPANSIBLE DENTAL IMPLANT

[76] Inventor: Alfred E. Edelman, 2723 Federal Street, Camden, N.J. 08105

[22] Filed: June 30, 1971

[21] Appl. No.: 158,397

[52] U.S. Cl. .............................................. 32/10 A
[51] Int. Cl. ........................................... A61c 13/00
[58] Field of Search .................... 128/92 B, 92 BC; 32/10 A

[56] References Cited
UNITED STATES PATENTS 3,497,953   3/1970   Weissman ........................ 32/10 A

*Primary Examiner*—Robert Peshock
*Attorney*—Munson H. Lane and Munson H. Lane, Jr.

[57] ABSTRACT

A dental implant has a dental support portion and an implant portion which is adapted to be embedded in the jaw bone. The implant consists of at least two members, at least one of which is movable relative to the other so that in an initial position the implant portion has a minimum effective width, but in an expanded position the width of the implant portion is substantially increased for anchorage thereof in the jaw bone.

16 Claims, 12 Drawing Figures

PATENTED JUN 12 1973

3,738,008

INVENTOR
ALFRED E. EDELMAN

BY Munson H. Lane
ATTORNEY

EXPANSIBLE DENTAL IMPLANT

This invention relates to new and useful improvements in dental implants of the general type having an implant portion which is adapted to be embedded in the jaw bone, and a dental support portion for mounting of an artificial tooth, a bridge, or the like. Conventional implants of this type usually have a dental support portion rigid with a blade-shaped implant portion, the latter being driven into the jaw bone by impacts delivered to the support portion. Ordinarily, a trench-like groove is formed in the jaw bone into which the implant portion is driven, the implant being held in place by its driving fit into the groove and also by subsequent bone growth into openings with which the implant portion is provided.

While these conventional implants are generally satisfactory, the principal object of the invention is to substantially increase the holding strength or retention of the implant in the jaw bone con-currently with the installation thereof, so that the implant is firmly and positively anchored in position.

This object is attained by providing an implant which, rather than being of a fixed size as in the prior art, is capable of being expanded during installation so that its effective width is substantially increased as the implant portion is driven into the jaw bone. Thus, the expanded implant is positively retained in place by mechanical anchorage in the bone and cannot be withdrawn unless it is contracted or the jaw bone is damaged.

Various embodiments of the expansible implant of the invention are disclosed in the accompanying drawings, in which like characters of reference are used to designate like parts, and in which.

Figure 1:
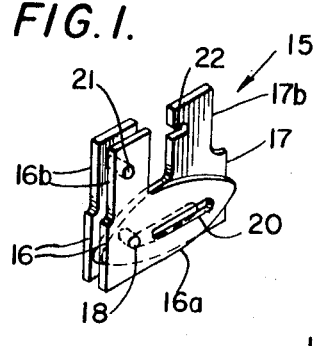
FIG. 1 is a perspective view of one embodiment of the invention in its contracted position.
Figure 2:
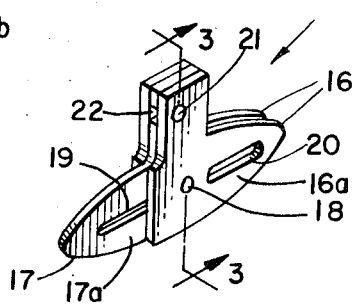
FIG. 2 is a perspective view thereof in the expanded position.
Figure 3:
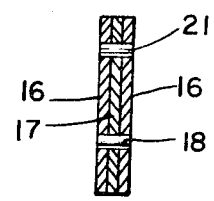
FIG. 3 is a sectional view taken substantially in the plane of the line 3—3 in FIG. 2.

Referring now to the accompanying drawings in detail, more particularly to FIGS. 1–3 inclusive, these show one embodiment of the expansible dental implant of the invention, designated generally by the numeral 15. The same comprises a set of three blade-like members disposed in juxtaposed contacting relation, that is, a pair of outer members 16 and an inner member 17 which is slidably disposed between the two outer members and in sliding contact therewith.

The members 16, 17 are substantially L-shaped, including horizontally elongated implant portions 16a, 17a, respectively, which are adapted to be embedded in the jaw bone, and vertically extending dental support portions 16b, 17b, respectively, provided at one end of the respective implant portions and rigidly connected thereto. As will be noted, the implant portions 16a, 17a are longitudinally tapered and sharp-edged for driving into the bone. The L-shaped form of the member 17 is reversed with respect to the members 16 so that in the contracted position of the device as shown in FIG. 1, the support portion 17b is spaced longitudinally away from the support portions 16b. However, when the support portions 16b, 17b are drawn together as shown in FIG. 2, the implant portions 16a, 17a are slid longitudinally past each other in opposite directions, and in parallel planes whereby the effective width of the implant is substantially expanded.

The two outer members 16 are rigidly connected together in transversely spaced relation by a pin 18 which is slidably received in a slot 19 formed in the inner member 17 so that sliding movement of the member 17 relative to the members 16 is facilitated. Slots 20 may also be formed in the implant portions 16a for additional anchorage of the device by bone growth in the slots 19, 20 after the implant is installed. If desired, a second pin 21 may extend transversely between the support portions 16b of the two outer members 16 for rigidly securing the same together in addition to the pin 18. When the device is expanded as shown in FIG. 2, the second pin 21 is received in a lateral notch 22 formed in the support portion 17b as shown in FIG. 1.

Prior to installation of the implant, a trench-like groove is made in the jaw bone, the length of the groove being only such as to accommodate the implant in its contracted position shown in FIG. 1. At its ends the groove may be undercut so that when the contracted implant is inserted in the groove and is expanded to the position shown in FIG. 2, the implant portions 16a, 17a are positively driven into the undercut ends of the groove and the expanded device is firmly and positively anchored in place. As already indicated, expansion of the implant portions 16a, 17a is effected by drawing together the support portions 16b, 17b which are disposed outwardly of the jaw bone. Undercutting of the bone at the ends of the groove may be desirable but not essential, inasmuch as the implant portions will in any event be forced into the bone at the ends of the groove during expansion of the implant.

Figure 4:
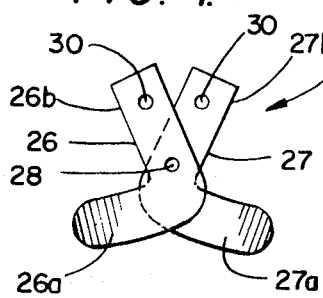
FIG. 4 is an elevational view of a second embodiment of the invention in its contracted position.
Figure 5:
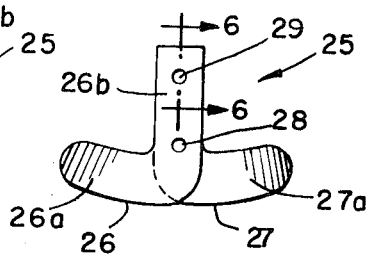
FIG. 5 is an elevational view of the embodiment of FIG. 4 in its expanded position.
Figure 6:
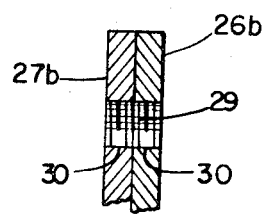
FIG. 6 is an enlarged, fragmentary sectional detail, taken substantially in the plane of the line 6—6 in FIG. 5.

A second embodiment of the invention is shown in FIGS. 4–6 and is designated generally by the reference numeral 25. This comprises a pair of substantially L-shaped members 26, 27 having curved implant portions 26a, 27a and dental support portions 26b, 27b. The two members are pivotally connected together by a pivot pin 28 located at a point between the portions 26a, 27a and the portions 26b, 27b, it being noted that the L-shaped configuration of the member 26 is reversed from the member 27 so that the implant portions 26a and 27a extend in opposite directions from or to the opposite sides of the pivot pin 28.

When the implant 25 is in its contracted position as shown in FIG. 4, the support portions 26b, 27b are mutually divergent and the implant portions 26a, 27a may be inserted in a groove cut in the jaw bone. Thereupon the support portions 26b, 27b are drawn together so that they are overlapped as shown in FIG. 5, this causing the implant portions 26a, 27a to spread apart in opposite directions so that they become embedded in the jaw bone beyond the ends of the pre-cut groove. Here again, the bone may be undercut at the ends of the groove, if so desired, to receive the projected implant portions.

A screw-threaded fastener 29 may be installed in apertures 30 which are formed in the support portions 26b, 27b, these apertures coming into register when the support portions are drawn together as in FIG. 5. The fastener 29 serves to retain the implant in its expanded position, and may also be used for securing an artificial tooth, a bridge, or the like, to the implant.

Figure 7:
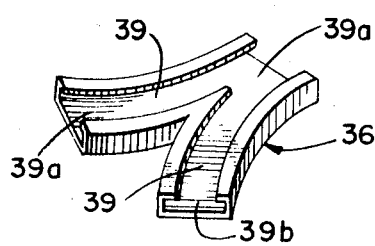
FIG. 7 is a perspective view of a guide member used in a third embodiment of the invention.
Figure 8:
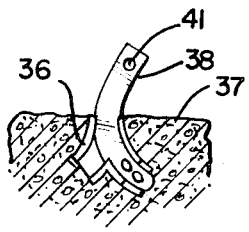
FIG. 8 is an elevational view of the third embodiment, showing one of the insert members being inserted into the guide member.
Figure 9:
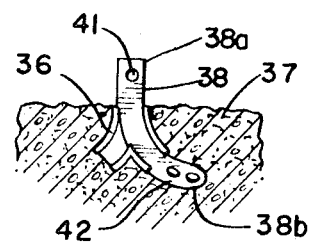
FIG. 9 is a view similar to FIG. 8 but with the insert member projected into the jaw bone.
Figure 10:
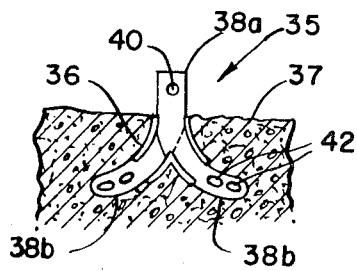
FIG. 10 is a view similar to FIG. 9 but with a second insert member in position in the guide member.

A third embodiment of the invention is illustrated in FIGS. 7-10 and as will be apparent from FIG. 10, this comprises a fixed guide member 36 which as a whole is adapted to be embedded in the jaw bone 37. The guide member 36 accommodates a pair of insert members 38 in the form of curved blades, these being slidably received in a pair of curved tracks 39 with which the guide member is provided. As is best shown in FIG. 7, the tracks 39 are open-ended, being confluent at one end 39a thereof and curving therefrom in opposite directions to their other ends 39b.

FIG. 8 shows one of the insert members 38 in the process of being slid into one of the tracks 39 of the guide member 36 after the latter has been embedded in the jaw bone 37. The insert member 38 is of a length greater than the guide member track, so that when it is completely inserted as shown in FIG. 9, an implant portion 38b projects outwardly from the end 39b of the track 39 and is embedded in the jaw bone. At the same time, the other end portion 38a of the insert member projects outwardly from the track end 39a and constitutes the dental support portion.

After the first of the two insert members 38 has been installed in one of the tracks 39, the second insert member is similarly installed in the second track, as shown in FIG. 10, it being understood that the confluent end portion 39a of the two tracks 39 is of such size that the two insert members 38 may be accommodated therein in superposed relation.

With the two insert members 38 installed in the guide member 36 as in FIG. 10, the superposed dental support portions 38a may be secured together by a screw-threaded fastener 40 inserted in apertures 41 with which these support portions are formed. The fastener 40 serves to retain the implant in its expanded position and may also be used for mounting an artificial tooth, a bridge, or the like, on the implant.

The implant portions 38b of the insert members 38 may be provided with openings 42 for additional anchorage by subsequent bone growth.

Figure 11:
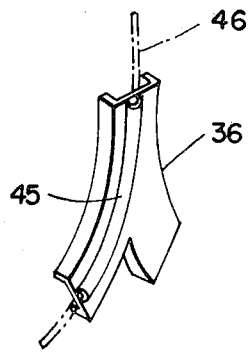
FIG. 11 is a perspective view of the guide member of FIG. 7 with a guide tube for a stabilizing pin.
Figure 12:
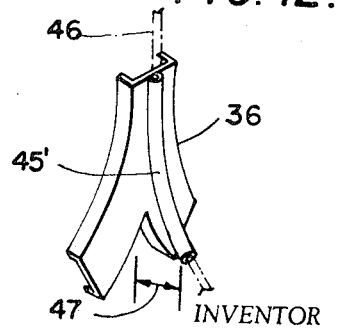
FIG. 12 is a view similar to FIG. 11 but showing another modification.

FIGS. 11 and 12 illustrate modifications of the guide member 36 of the embodiment 35. In FIG. 11 a curved guide tube 45 is secured to the back of the guide member, the tube being open-ended and adapted to slidably receive a curved stabilizer pin 46 which is passed through the guide tube and projected into the bone to assist in retaining the guide member 36 in position. In the arrangement of FIG. 11 the guide tube 45 lies flat against the back of the guide member 36, while in the arrangement of FIG. 12 the guide tube 45' is disposed in a plane normal to the back of the guide member. In the latter arrangement, one end portion of the tube 45' is secured to the back of the guide member while its other end portion curves away from the guide member back by a suitable distance indicated at 47.

It is to be understood that in FIGS. 11 and 12 the guide tube 45 and 45', respectively, is provided to receive the stabilizer pin 46 to assist in securing the guide member 36 in the jaw bone. In both arrangements (FIGS. 11 and 12), the guide member 36 also receives the two insert members 38, as already described in connection with the embodiment 35 of FIGS. 7-10.

Notably, all the disclosed embodiments of the invention utilize the basic concept of an expansible dental implant having at least two overlapping, juxtaposed, contacting flat members, at least one of which is movable relative to the other in a plane parallel to the plane of the other member, so that the implant in its contracted position may be inserted in a groove cut in the jaw bone and then expanded beyond the limits of the groove for purposes of positive anchorage.

While in the foregoing there have been shown and described the preferred embodiments of the invention, various modifications and equivalents may be resorted to within the spirit and scope of the invention as claimed.

What is claimed is:

1. An expansible dental implant having a dental support portion and an implant portion adapted to be embedded in the jaw bone, said implant portion comprising at least two flat, juxtaposed, contacting members at least one of which is movable relative to the other in a plane parallel to the plane of the other member from an initial position in which the implant portion has a minimum effective width to an expanded position in which the width of the implant portion is substantially increased for anchorage thereof in the jaw bone.

2. The device as defined in claim 1 wherein said implant portion members are slidably connected together for sliding movement in relatively opposite directions.

3. The device as defined in claim 2 wherein said dental support portion comprises at least two members rigidly connected to the respective two members of said implant portion.

4. The device as defined in claim 1 wherein said implant portion members are pivotally connected together.

5. The device as defined in claim 4 wherein said dental support portion comprises at least two members rigidly connected to the respective two members of said implant portion.

6. The device as defined in claim 1 wherein one of said implant portion members comprises a fixed guide member, the other of said members being slidable in and projectable outwardly from said guide member.

7. In an expansible dental implant having a dental support portion and an implant portion adapted to be embedded in the jaw bone, the combination of at least two juxtaposed, smooth, flat, parallel contacting blade-shaped members and means slidably connecting the same together for sliding movement in parallel planes and in relatively opposite directions from an initial position in which the implant portion has a minimum effective width to an expanded position in which the width of the implant portion is substantially increased for anchorage thereof to the jaw bond.

8. The device as defined in claim 7 wherein said slidable connecting means comprise a pin carried by one of said members and slidable in a slot formed in the other member.

9. The device as defined in claim 7 together with a third blade-shaped member juxtaposed to the two first mentioned members so as to provide two outside members and an inside member slidably interposed therebetween, said slidable connecting means comprising a transverse pin extending between and rigidly connecting said two outside members together, said inside member being formed with a slot slidably receiving said pin.

10. The device as defined in claim 7 wherein each of said blade-shaped members has a horizontally elongated implant portion and a dental support portion projecting vertically from one end of the implant portion so that the dental support portions are spaced apart longitudinally in the initial contracted position of the implant portions and also that the implant portions may be urged to the expanded position by drawing the dental support portions together.

11. In an expansible dental implant having a dental support portion and an implant portion adapted to be embedded in the jaw bone, the combination of two flat, juxtaposed, contacting blade-shaped members having a substantially L-shaped configuration and including a substantially horizontal implant portion and a substantially vertical dental support portion integral therewith, and a pin pivotally connecting said members together at a point between the implant portions and the dental support portions thereof so that the dental support portions are spaced apart when the implant portions are in the initial contracted position and also that the implant portions may be urged to the expanded position in planes parallel to their flat surfaces by drawing the dental support portions together.

12. The device as defined in claim 11 together with means provided in said dental support portions for locking the same together in the expanded position of the device.

13. The device as defined in claim 11 which is further characterized in that the implant portions of said members are elongated and longitudinally curved, extending in relatively opposite directions from said pivot pin.

14. In an expansible dental implant, the combination of a fixed guide member adapted to be embedded in the jaw bone and provided with a curved, flat, open-ended track, and a curved, flat insert member slidable in the track of said guide member, the length of said insert member being greater than that of the guide member track so that in its inserted position the insert member projects at both ends from the guide member, one projecting end portion of the insert member constituting a dental support portion and the other projecting end portion thereof constituting an implant portion for embedding in the jaw bone.

15. The device as defined in claim 14 wherein said guide member is also provided with a second curved open-ended track one end of which is confluent with one end of the first mentioned track, the two tracks curving in opposite directions from their confluent end, and a second curved insert member slidable in the second track of the guide member.

16. The device as defined in claim 14 together with a curved guide tube secured to said guide member and having open ends, and a curved stabilizing pin slidably inserted in said guide tube, said pin being projectable from the guide tube into the jaw bone.

* * * * *